(12) United States Patent
Sugimoto et al.

(10) Patent No.: US 10,291,161 B2
(45) Date of Patent: May 14, 2019

(54) BRUSHLESS MOTOR DEVICE, IMAGE FORMING APPARATUS, AND CONTROL METHOD FOR CONTROLLING BRUSHLESS MOTOR

(71) Applicant: BROTHER KOGYO KABUSHIKI KAISHA, Nagoya-shi, Aichi-ken (JP)

(72) Inventors: Tasuku Sugimoto, Nagoya (JP); Hironori Hirata, Nagoya (JP); Masafumi Ito, Kiyosu (JP)

(73) Assignee: BROTHER KOGYO KABUSHIKI KAISHA, Nagoya-Ahi, Aichi-Ken (JP)

( * ) Notice: Subject to any disclaimer, the term of this patent is extended or adjusted under 35 U.S.C. 154(b) by 0 days.

(21) Appl. No.: 15/937,167

(22) Filed: Mar. 27, 2018

(65) Prior Publication Data

US 2018/0287524 A1    Oct. 4, 2018

(30) Foreign Application Priority Data

Mar. 31, 2017   (JP) .................................. 2017-069602

(51) Int. Cl.
| B41J 29/38 | (2006.01) |
| H02P 6/18 | (2016.01) |
| B41J 2/47 | (2006.01) |
| H02P 6/20 | (2016.01) |

(52) U.S. Cl.
CPC .............. *H02P 6/181* (2013.01); *B41J 2/471* (2013.01); *B41J 29/38* (2013.01); *H02P 6/20* (2013.01)

(58) Field of Classification Search
CPC ... H02P 6/181; H02P 6/20; B41J 2/471; B41J 29/38
See application file for complete search history.

(56) References Cited

U.S. PATENT DOCUMENTS

| 2005/0140320 | A1* | 6/2005 | Hidaka | ................... H02P 6/085 318/379 |
| 2009/0090574 | A1* | 4/2009 | Kuno | .................... B60W 20/15 180/65.265 |
| 2010/0052587 | A1* | 3/2010 | Bonvin | ................. G11B 19/20 318/400.32 |
| 2015/0236627 | A1 | 8/2015 | Hirata | |

FOREIGN PATENT DOCUMENTS

JP       2015-152802 A      8/2015

* cited by examiner

*Primary Examiner* — Yaovi M Ameh
(74) *Attorney, Agent, or Firm* — Merchant & Gould P.C.

(57) ABSTRACT

A brushless motor device configured to: determine a first upper limit of a current value which flows through a coil when a rotation speed of a rotor is accelerated from a first speed to a second speed, wherein, in a case where the current value of the first upper limit flows through the coil when the rotor is rotated at the second speed, a first time period, which is from a start of a non-energization time period of the coil until an induced voltage reaches a threshold value, is longer than a second time period, which is from the start of the non-energization time period until a counter-electromotive voltage becomes zero; and change switching of each switching element of an inverter circuit by using a second upper limit greater than the first upper limit and the first upper limit.

11 Claims, 13 Drawing Sheets

| CURRENT VALUE | COUNTER-ELECTROMOTIVE TIME PERIOD |
|---|---|
| 0.2 | 0.001052 |
| 0.3 | 0.001315 |
| 0.4 | 0.001547 |
| 0.5 | 0.001734 |
| 0.6 | 0.001902 |
| 0.7 | 0.002046 |
| 0.8 | 0.002175 |
| 0.9 | 0.002306 |
| 1.0 | 0.002409 |
| 1.1 | 0.002484 |
| 1.2 | 0.002562 |
| 1.3 | 0.002657 |
| 1.4 | 0.002742 |
| 1.5 | 0.002789 |
| 1.6 | 0.002864 |

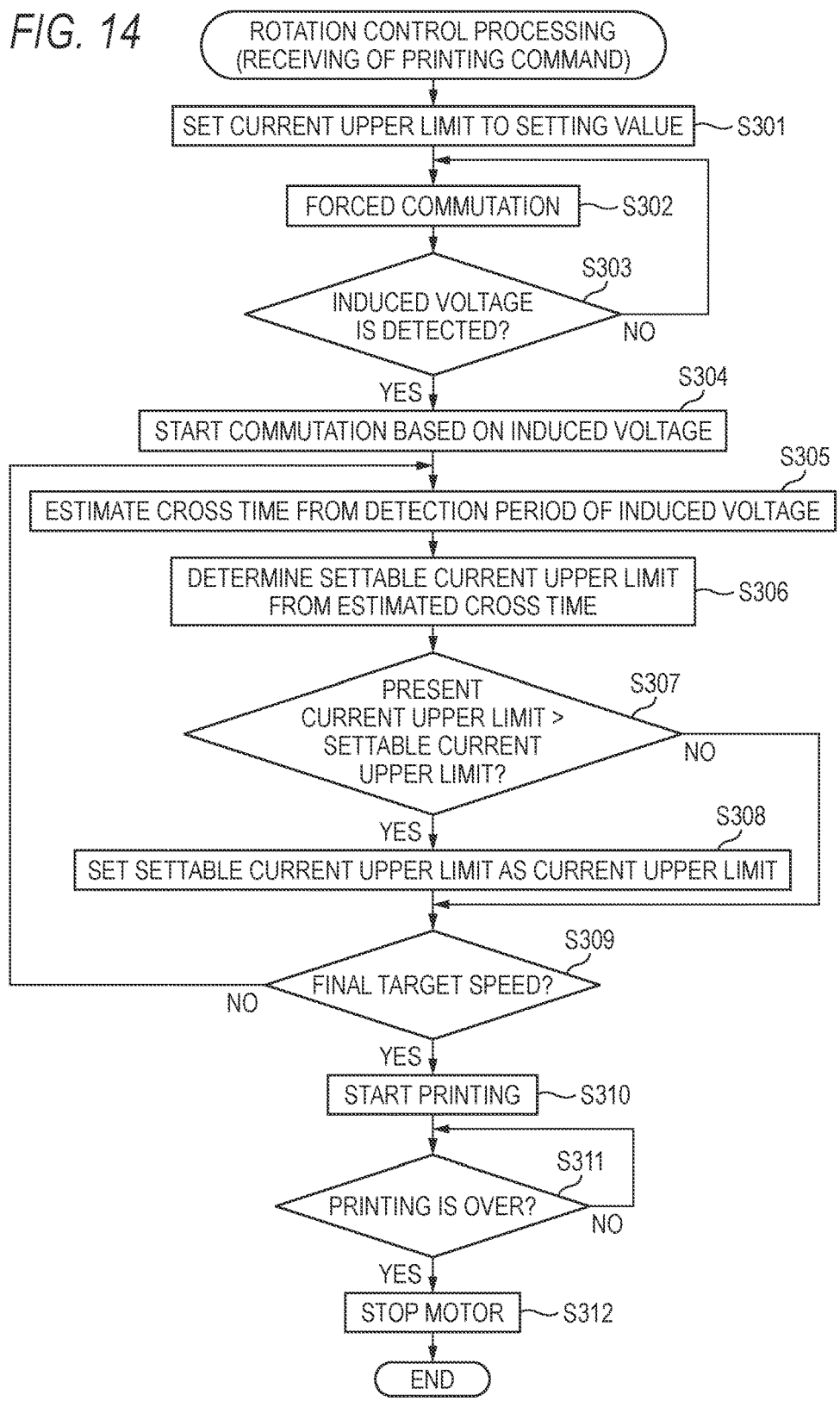

BRUSHLESS MOTOR DEVICE, IMAGE FORMING APPARATUS, AND CONTROL METHOD FOR CONTROLLING BRUSHLESS MOTOR

CROSS-REFERENCE TO RELATED APPLICATIONS

This application claims priority from Japanese Patent Application No. 2017-069602 filed on Mar. 31, 2017, the entire contents of which are incorporated herein by reference.

TECHNICAL FIELD

The present disclosure relates to a brushless motor device, an image forming apparatus, and a control method for controlling a brushless motor.

BACKGROUND

As a technology of a brushless motor device, a technology of performing energization switching of a coil by using an induced voltage generated in the coil of each phase without using a Hall element has been known. For example, related art discloses a configuration of detecting a cross point of an induced voltage and a threshold value and performing energization switching of a coil based on detection timing of the cross point. Also, related art discloses a problem that it becomes difficult to detect the cross point due to a counter-electromotive voltage associated with the energization switching of the coil.

SUMMARY

According to an aspect of the present disclosure, there is provided a brushless motor device including: a brushless motor including a rotor having a magnetic pole; and a stator including a coil including a first coil, a second coil, and a third coil, first ends of the first coil, the second coil, and the third coil being Y-connected to each other; and a motor driver configured to drive the brushless motor, the motor driver including an inverter circuit including: first switching elements respectively arranged between second ends of the first coil, the second coil, and the third coil and a power supply voltage; and second switching elements respectively arranged between the second ends of the first coil, the second coil, and the third coil and a ground voltage; wherein the motor driver is configured to: determine a first upper limit of a current value which flows through the coil when a rotation speed of the rotor is accelerated from a first rotation speed to a second rotation speed higher than the first rotation speed, wherein, in a case where the current value of the first upper limit flows through the coil when the rotor is rotated at the second rotation speed, a first time period, which is from a start of a non-energization time period of the coil until an induced voltage reaches a threshold value, is longer than a second time period, which is from the start of the non-energization time period of the coil until a counter-electromotive voltage becomes zero; perform first switching processing of switching ON and OFF states of each switching element of the inverter circuit within a range in which current flowing through the coil becomes equal to or smaller than a second upper limit greater than the first upper limit; perform second switching processing of switching the ON and OFF states of each switching element of the inverter circuit within a range in which the current flowing through the coil becomes equal to or smaller than the first upper limit; and change the first switching processing to the second switching processing during a time period in which the rotation speed of the rotor is accelerated from the first rotation speed to the second rotation speed.

A control method for implementing the functions of the above device, a computer program and a computer-readable storage medium having the computer program stored therein are also novel and useful.

BRIEF DESCRIPTION OF DRAWINGS

FIG. 9 is a table depicting an example of the relation between the current value and the counter-electromotive time period;

FIG. 14 is a flowchart depicting a sequence of rotation control processing.

DETAILED DESCRIPTION

Hereinafter, an illustrative embodiment the image forming apparatus of the present disclosure will be described with reference to the accompanying drawings. In the illustrative embodiment, the present disclosure is applied to a laser printer capable of forming a color image.

Figure 1:
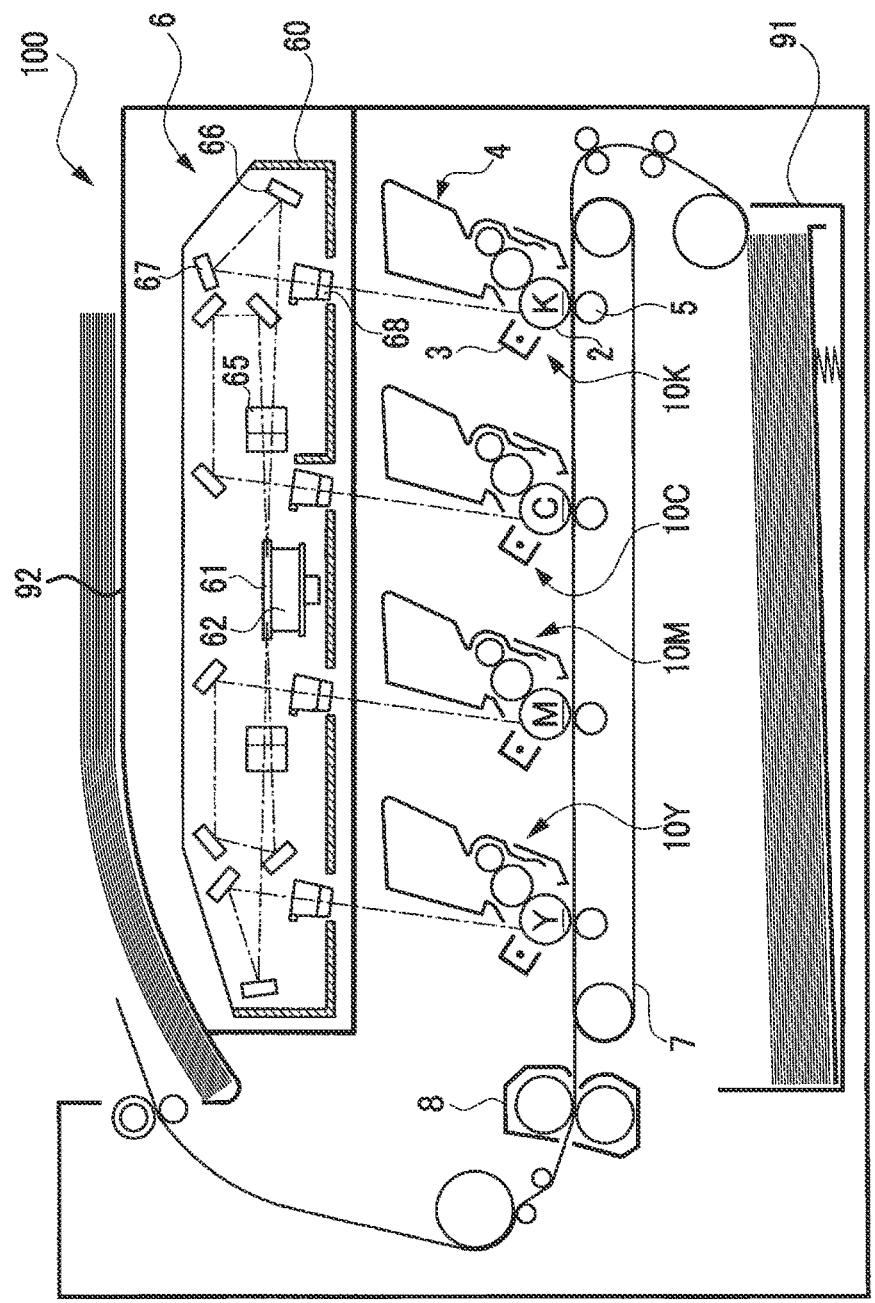
FIG. 1 is a sectional view depicting a schematic configuration of a printer in accordance with an illustrative embodiment.

As schematically shown in FIG. 1, a printer 100 of the illustrative embodiment is a so-called tandem-type color laser printer. The printer 100 includes process units 10Y, 10M, 10C, 10K of yellow (Y), magenta (M), cyan (C) and black (K). The process unit 10K includes a photosensitive member 2, a charging unit 3, a developing unit 4, and a transfer unit 5. The process units 10Y, 10M, 10C of the other colors have also the similar configurations. Also, the printer 100 includes an exposure unit 6, which is common to the respective colors and is arranged above the process units of the respective colors. Also, the printer 100 includes a conveyor belt 7, a fixing unit 8, a feeder tray 91, and a sheet discharge tray 92.

First, an overall printing operation of the printer 100 is briefly described. In the below, image formation by the process unit 10K is described. During the printing operation, the printer 100 is configured to charge the photosensitive member 2 by the charging unit 3 and then to exposure the same by the exposure unit 6. Thereby, an electrostatic latent image based on image data is formed on a surface of the photosensitive member 2. Also, the printer 100 is configured to develop the electrostatic latent image by the developing unit 4, thereby forming a toner image.

Also, the printer 100 is configured to draw out sheets accommodated in the feeder tray 91 one by one and to convey the same to the conveyor belt 7. While the sheet passes between the photosensitive member 2 and the transfer unit 5, the printer 100 is configured to transfer the toner image on the photosensitive member 2 to the sheet in the transfer unit 5. Also, the printer 100 is configured to fix the toner image on the sheet in the fixing unit 8. The sheet having an image formed thereon in this way is discharged to the sheet discharge tray 92.

In the meantime, in a case of executing a color printing operation, the printer 100 forms toner images of respective colors in the process units 10Y, 10M, 10C of the other colors, and sequentially transfers the toner images to the sheet. Thereby, the toner images are overlapped on the sheet. The overlapped toner images are fixed on the sheet, so that a color image is formed.

Subsequently, a configuration of the exposure unit 6 is described with reference to FIGS. 1 and 2. The exposure unit 6 includes a housing 60, a laser diode 63 configured to emit a laser light, and a variety of optical members for irradiating the laser light emitted from the laser diode 63 toward the photosensitive member 2. As the variety of optical members, the printer 100 includes a polygon mirror 61, a coupling lens 64, an fθ lens 65, a turning back mirror 66, a turning back mirror 67, and a toric lens 68, for example. Also, the printer 100 includes a brushless motor 62 for rotating the polygon mirror 61. The brushless motor 62 will be described later in detail. The laser diode 63 is an example of the light source, and the polygon mirror 61 is an example of the mirror.

Figure 2:
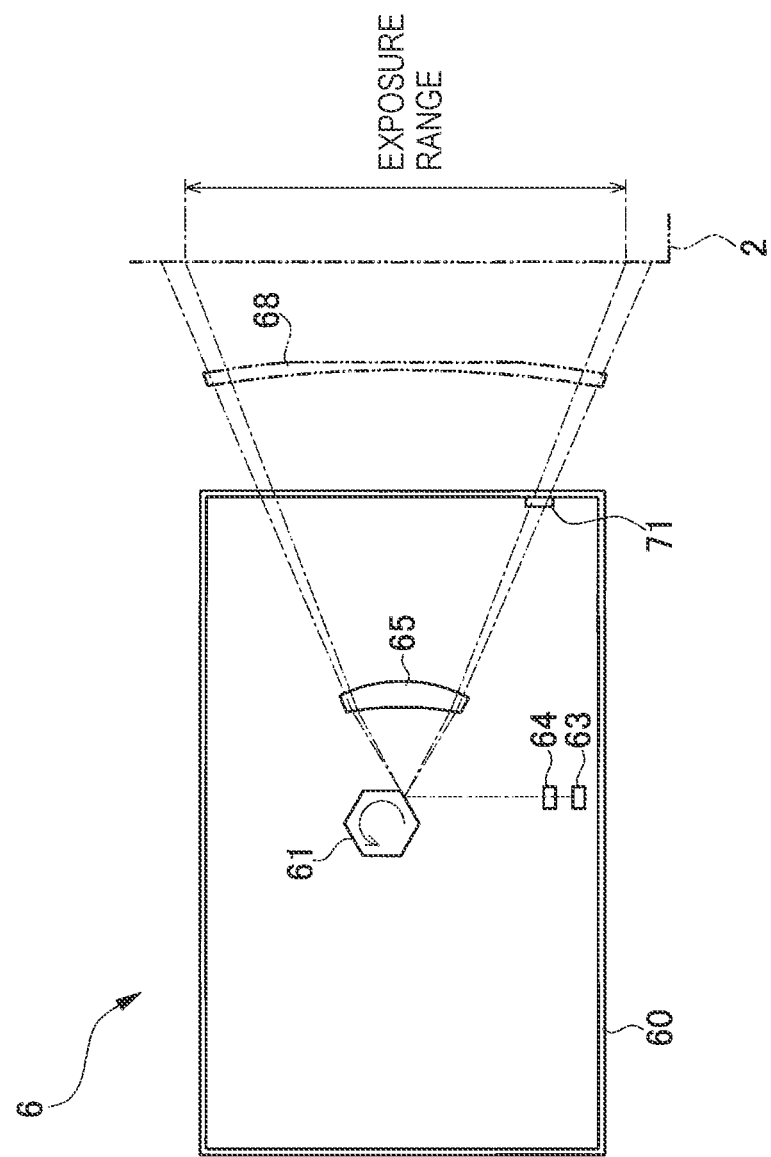
FIG. 2 illustrates a schematic configuration of an exposure unit.

In FIG. 2, only a part, which relates to the process unit 10K of black, of the exposure unit 6 is virtually shown, as seen from the upper of FIG. 1, without turning back a light path behind the turning back mirrors 66, 67. Also, a virtual position of the photosensitive member 2 is shown at the right end of FIG. 2.

As shown in FIG. 2, in the exposure unit 6, the laser light emitted from the laser diode 63 is converted into a light beam via the coupling lens 64, which is then incident on the polygon mirror 61. The polygon mirror 61 has a regular hexagonal shape, as seen from above, and is configured to rotate at constant high speed by the brushless motor 62 and to reflect the light beam during the image formation. The light beam is deflected in association with the rotation of the polygon mirror 61 and is scanned upward from the lower in FIG. 2.

As shown in FIG. 1, the light beam reflected on the polygon mirror 61 is irradiated to the photosensitive member 2 via the fθ lens 65, the turning back mirrors 66, 67, and the toric lens 68. That is, one line part of the photosensitive member 2 is axially exposed by the light beam reflected on one plane of the polygon mirror 61, so that an electrostatic latent image of one line part is formed. A range in which the photosensitive member 2 can be axially exposed, i.e., an image formation range in which an image is to be formed is denoted as an exposure range in FIG. 2.

Also, as shown in FIG. 2, the printer 100 includes a BD (Beam Detect) sensor 71 provided on an inner wall surface of the housing 60 of the exposure unit 6. The BD sensor 71 is configured to receive the laser light reflected on the polygon mirror 61 and to output BD signals of which output values are different depending on whether the laser light is received. The BD signal is used to determine writing timing of each scan line by the laser light, for example. Also, the printer 100 can acquire a rotation speed of the brushless motor 62, based on timing at which the BD signal is received.

Figure 3:
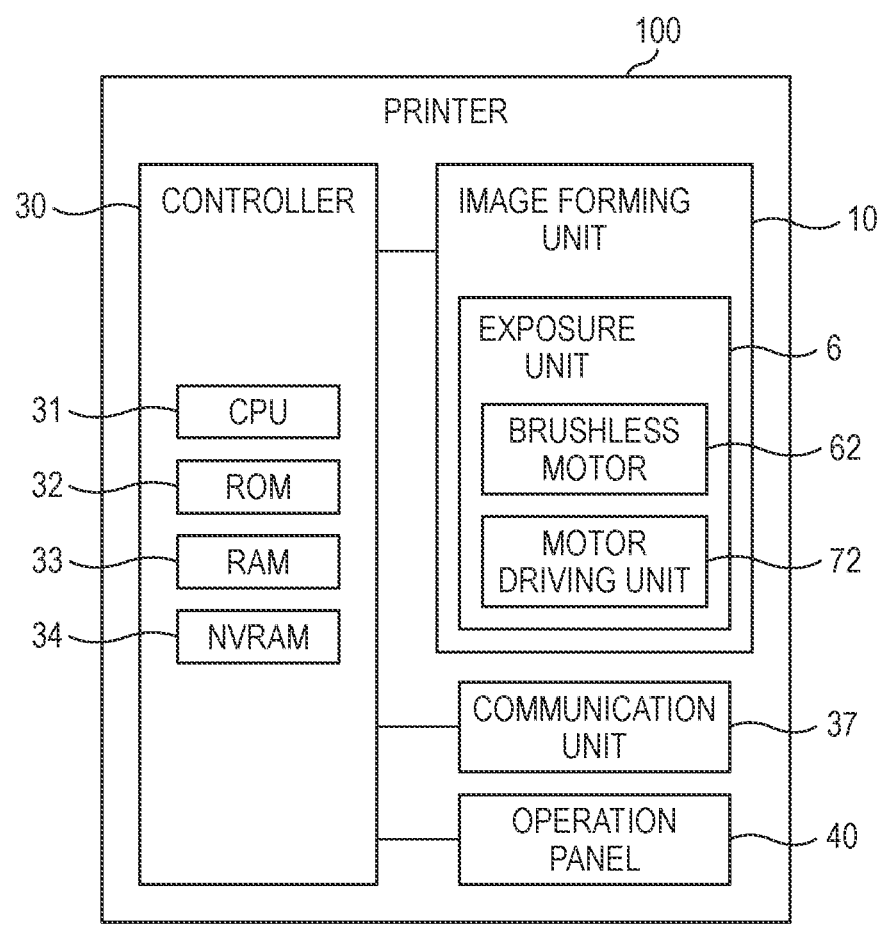
FIG. 3 is a block diagram depicting an electrical configuration of the printer.

Subsequently, an electrical configuration of the printer 100 is described. As shown in FIG. 3, the printer 100 has a controller 30 including a CPU 31, a ROM 32, a RAM 33, and an NVRAM (non-volatile RAM) 34. Also, the printer 100 includes an image forming unit 10, a communication unit 37, and an operation panel 40, which are electrically connected to the controller 30. The exposure unit 6 of the image forming unit 10 includes the brushless motor 62, and a motor driving unit 72 configured to control rotation of the brushless motor 62. The motor driving unit 72 will be described later in detail.

In the ROM 32, a variety of control programs for controlling the printer 100, a variety of settings, an initial value and the like are stored. The RAM 33 is used as a work area to which the diverse programs are read or as a storage area in which data is temporarily stored. The NVRAM 34 is used as a storage area in which image data and diverse setting values are stored. The ROM 32 or the NVRAM 34 is an example of the memory.

The CPU 31 is configured to store a processing result in the RAM 33 or the NVRAM 34 and to control the respective constitutional elements of the printer 100, in response to the control program read out from the ROM 32. The CPU 31 is an example of the control device. The controller 30 may be an example of the control device. Also, the motor driving unit 72 may be an example of the control device. In the meantime, the controller 30 in FIG. 3 is a collective term of hardware such as the CPU 31 that is used for controlling the printer 100, and it does not necessarily mean that the controller 30 indicates single hardware actually existing in the printer 100.

The communication unit 37 is hardware for performing communication with an apparatus connected to the printer 100 via a network and the like. The operation panel 40 is hardware configured to display a notification to a user, and to receive a user's instruction input.

Figure 4:
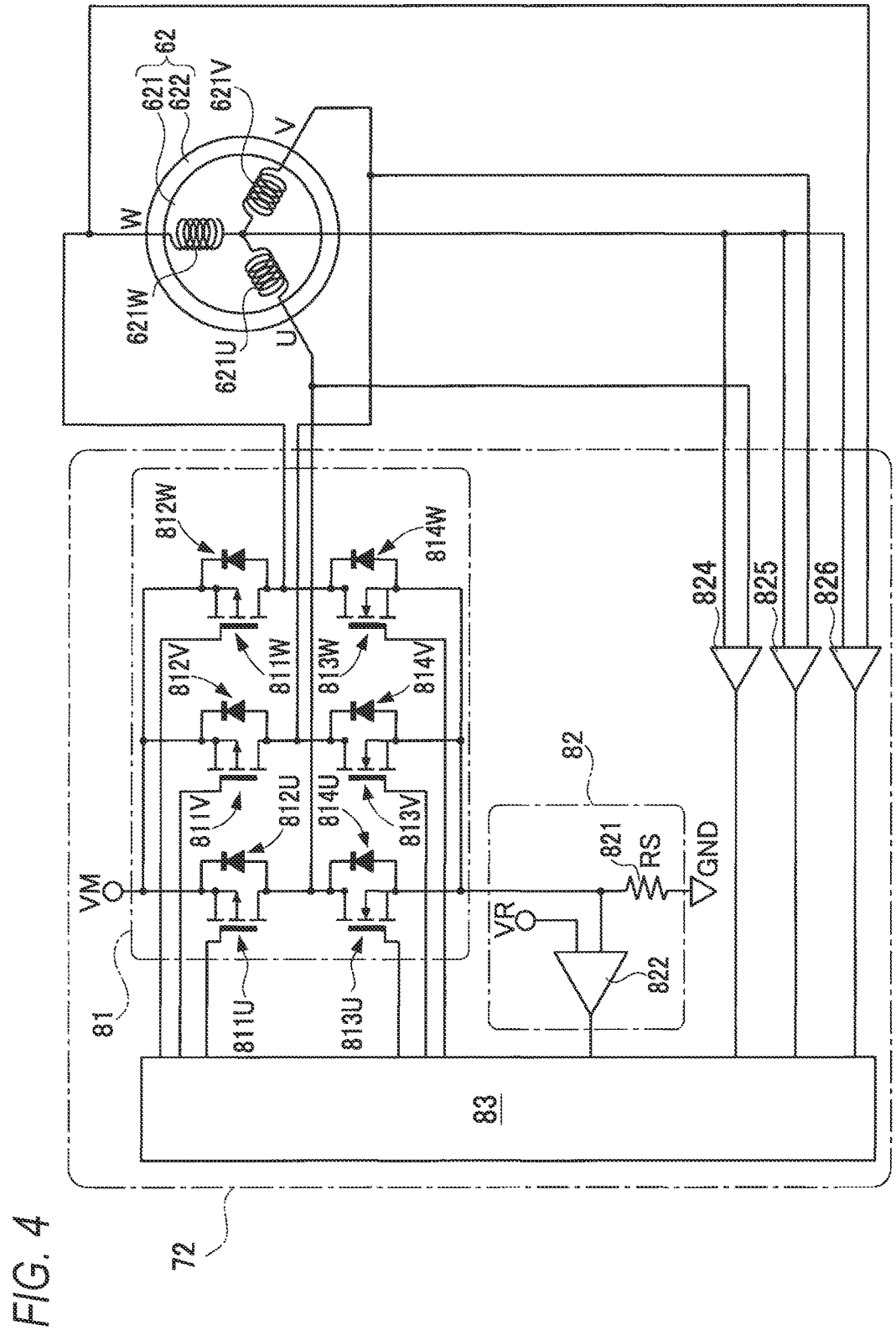
FIG. 4 is a pictorial view depicting configurations of a brushless motor and a motor driving unit.

Subsequently, the rotative driving of the brushless motor 62 is described. As shown in FIG. 4, the brushless motor 62 includes a stator 621 in which Y-connected coils of three phases are arranged, and a rotor 622 in which a plurality of permanent magnets is arranged. The stator 621 includes a U-phase coil 621U, a V-phase coil 621V and a W-phase coil 621W of which one ends are connected to each other at a neutral point. The polygon mirror 61 of the exposure unit 6 is attached to the rotor 622 of the brushless motor 62, and is configured to rotate integrally with the rotor 622.

The printer 100 includes the motor driving unit 72 configured to drive the brushless motor 62. As shown in FIG. 4, the motor driving unit 72 includes an inverter circuit 81 configured to selectively apply a voltage to the coils 621U, 621V, 621W of respective phases of the stator 621, a current measurement unit 82, a comparator 824, a comparator 825, a comparator 826, and a control circuit 83 configured to drive the inverter circuit 81.

As shown in FIG. 4, the inverter circuit 81 has six switching elements 811U, 811V, 811W, 813U, 813V, 813W, and six freewheeling diodes 812U, 812V, 812W, 814U, 814V, 814W. In the below, suffixes for discriminating U, V and W phases are omitted if the discrimination is not required.

The other ends, which are not one ends connected to the neutral point, of the coils 621 of respective phases are respectively connected with the High-side switching element 811 and the Low-side switching element 813. The High-side switching element 811 is arranged between the other end of the coil 621 and a power supply voltage (VM). The Low-side switching element 813 is arranged between the other end of the coil 621 and a ground voltage (GND). Each freewheeling diode 812 is connected in parallel with the corresponding switching element 811. Each freewheeling diode 814 is connected in parallel with the corresponding switching element 813.

The current measurement unit 82 is arranged between the inverter circuit 81 and the GND. That is, the current measurement unit 82 is arranged between a GND-side terminal of the Low-side switching element 813 of each phase of the inverter circuit 81 and the GND. Also, the current measurement unit 82 includes a reference resistance (RS) 821 and a comparator 822. The comparator 822 is configured to compare a reference voltage (VR) and a voltage to be applied to the RS 821 and to transmit a signal corresponding to a current value to flow through the RS 821 to the control circuit 83.

Figure 5:
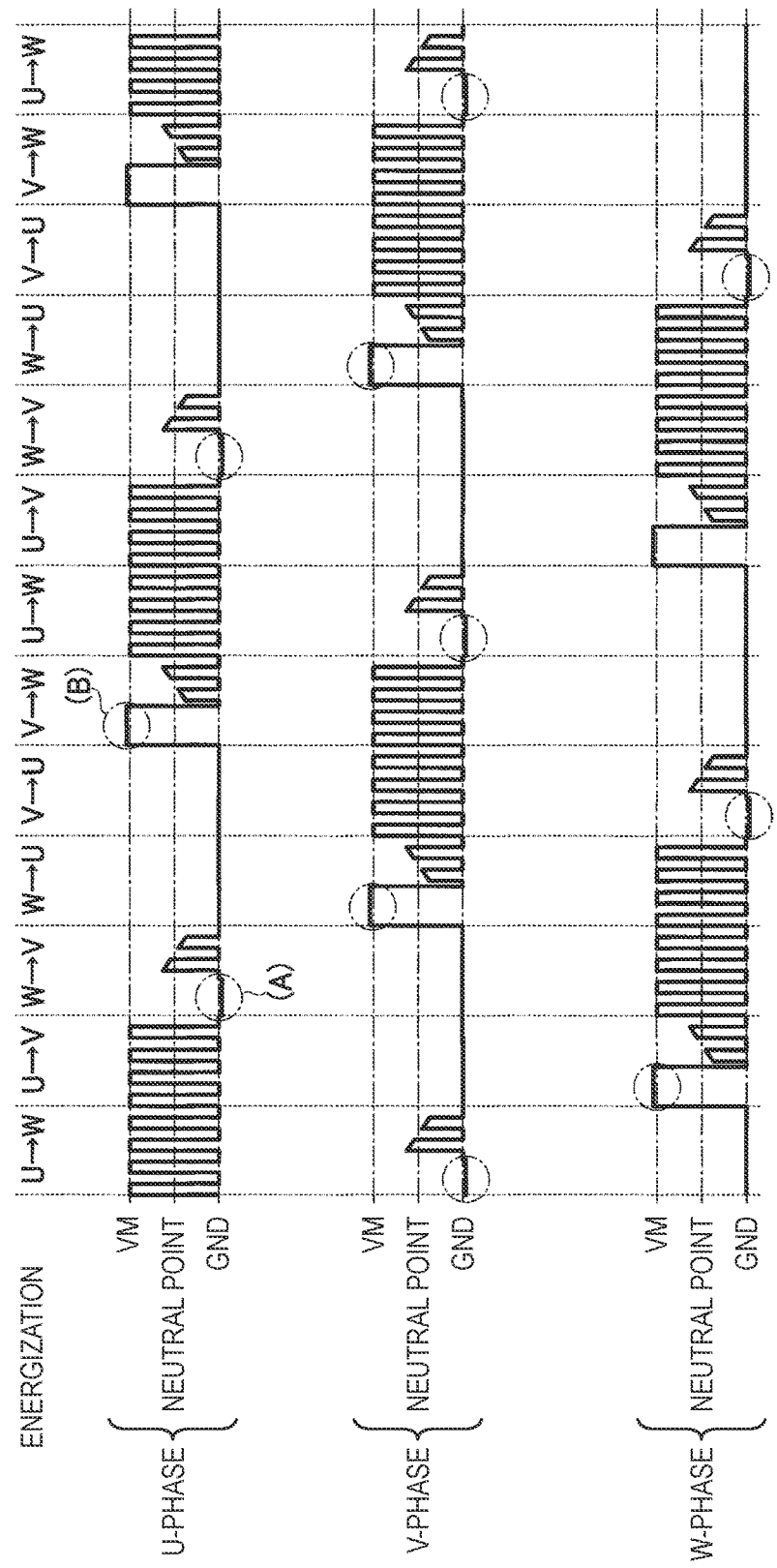
FIG. 5 is a waveform view depicting an example of an induced voltage that is generated in a coil of the brushless motor.

The motor driving unit 72 of the printer 100 is configured to execute switching processing of switching ON and OFF states of the six switching elements 811, 813 of the inverter circuit 81 and driving the brushless motor 62 in a 120° energization manner. As a result, as shown in FIG. 5, for the coil 621 of each phase, an energization state in which an applying time period of a positive voltage of an electric angle 120°, a non-energization time period of an electric angle 60°, an applying time period of a negative voltage of an electric angle 120° and a non-energization time period of an electric angle 60° configure one period is repeated. In the meantime, the motor driving unit 72 is configured to control a voltage, which is to be applied for the applying time period of the positive voltage, by PWM control.

Specifically, as shown in FIG. 5, the motor driving unit 72 sequentially switches the energization state in order of U→W, U→V, W→V, W→U, V→U and V→W, returns to U→W after V→W, and repeats the switching in the same order. In the meantime, for example, U→W indicates an energization state in which the U-phase is in an applying time period of a positive voltage, the W-phase is in an applying time period of a negative voltage and current flows from the U-phase toward the W-phase. The positive side (high voltage side) is switched in order of U-phase→W-phase→V-phase, and the negative side (low voltage side) is switched in order of U-phase→W-phase→V-phase at intermediate timing of the phase switching timing of the positive side.

The motor driving unit 72 is configured to detect a position of the rotor 622 without using a position detection element such as a Hall element. When the rotor 622 rotates, a magnet of an S-pole and a magnet of an N-pole of the rotor 622 alternately come close to each coil 621 configuring the stator 621. Thereby, a magnetic flux in the coil 621 changes, and an induced voltage is generated in the coil 621. The induced voltage exhibits a waveform periodically changing to different levels between the cases where the S-pole comes close to the coil and the N-pole comes close to the coil.

Therefore, it is possible to detect a position of the rotor 622, i.e., a polarity of the magnet approaching to the coil 621 by detecting the induced voltage.

The motor driving unit 72 is configured to compare an induced voltage, which is generated in the coil 621, and a voltage of the neutral point of Y-connection based on the comparators 824, 825, 826, and to switch the energization state to the coil 621 of each phase based on a result of the comparison, for the non-energization time period of each coil 621. For this reason, as shown in FIG. 4, the motor driving unit 72 is provided with the comparators 824, 825, 826. That is, the control circuit 83 is configured to switch the coil, which is an energization target, based on timing at which the output signals from the comparators 824, 825, 826 are inverted, i.e., timing at which the induced voltage reaches the voltage of the neutral point. In the meantime, the timing at which the output signal from the comparator 824 is inverted corresponds to timing at which the induced voltage generated in the U-phase increases and intersects with the voltage of the neutral point or timing at which the induced voltage generated in the U-phase decreases and intersects with the voltage of the neutral point, for example.

Also, the motor driving unit 72 is configured to acquire a rotation speed of the brushless motor 62, based on a period of a cross point at which the induced voltage and the voltage of the neutral point intersect with each other, i.e., an inversion period of each output signal from the comparator 824, 825, 826. The motor driving unit 72 is configured to change a duty ratio of the PWM control during the applying time period of the positive voltage to each coil 621, as rotation speed control of the brushless motor 62. Specifically, the motor driving unit 72 is configured to acquire the rotation speed of the brushless motor 62 and to compare the same with a target speed. In a case where acceleration is performed, the motor driving unit 72 increases the duty ratio, and in a case where deceleration is performed, the motor driving unit 72 decreases the duty ratio. Thereby, the motor driving unit 72 accelerates or decelerates the brushless motor 62 to control the rotation speed of the brushless motor 62 to be a target rotation speed.

In the meantime, as described above, the motor driving unit 72 may be configured to acquire the rotation speed of the brushless motor 62, based on the BD signal. In a case where the rotation speed of the brushless motor 62 is in a low speed region, the motor driving unit 72 acquires the rotation speed based on a period of the cross point, and in a case where the rotation speed of the brushless motor 62 is in a high speed region, the motor driving unit 72 acquires the rotation speed based on the BD signal. The reason is that a scanning speed of the light beam is slow in the low speed region, so that if the rotation speed control is performed based on the BD signal, the photosensitive member 2 is irradiated for a long time. If the rotation speed control based on the BD signal is repeated in the low speed region, the photosensitive member 2 may be deteriorated. Therefore, it is preferable to acquire the rotation speed based on the period of the cross point, in the low speed region.

Also, a current upper limit of the inverter circuit 81 is set for the control circuit 83. In a case where a current value measured by the current measurement unit 82 exceeds the set current upper limit, the control circuit 83 lowers the duty ratio to decrease the current value. Upon acceleration of the brushless motor 62, for example, the control circuit 83 is configured to keep the duty ratio high within a range in which a current value measured by the current measurement unit 82 does not exceed the set current upper limit, thereby increasing the rotation speed of the brushless motor 62.

In the brushless motor 62, after switching the energization state, a counter-electromotive voltage attributable to the coil 621 is generated. In a case where any phase is switched from the applying time period of the positive voltage to the non-energization time period, for example, in the U-phase immediately after the switching from U→V to W→V, a counter-electromotive voltage of a voltage lower than the GND is generated, as shown in (A) of FIG. 5. Hereinafter, this counter-electromotive voltage is referred to as counter-electromotive voltage (A), and a time period in which the counter-electromotive voltage (A) is generated is referred to as counter-electromotive time period (A). The counter-electromotive time period (A) is a time period in which current (regenerative current (A)) to flow back through the Low-side freewheeling diode 814 is generated by the counter-electromotive voltage (A) generated in the coil 621 of the switched phase (for example, the U-phase).

Also, in a case where any phase is switched from the applying time period of the negative voltage to the non-energization time period, for example, in the U-phase immediately after the switching from V→U to V→W, a counter-electromotive voltage of a voltage higher than the VM is generated, as shown in (B) of FIG. 5. Hereinafter, this counter-electromotive voltage is referred to as counter-electromotive voltage (B), and a time period in which the counter-electromotive voltage (B) is generated is referred to as counter-electromotive time period (B). The counter-electromotive time period (B) is a time period in which current (regenerative current (B)) to flow back through the High-side freewheeling diode 812 is generated by the counter-electromotive voltage (B) generated in the coil 621 of the switched phase (for example, the U-phase coil).

The counter-electromotive time period (A) or the counter-electromotive time period (B) is time from the start of the non-energization time period until the counter-electromotive voltage becomes zero, and is a time period in which it is not possible to appropriately acquire the cross point because it is not possible to normally detect the induced voltage. That is, when timing at which the induced voltage reaches the voltage of the neutral point is in the counter-electromotive time period (A) or the counter-electromotive time period (B), it is not possible to appropriately acquire the cross point with the control circuit 83. The counter-electromotive time period (A) or the counter-electromotive time period (B) is an example of the second time period. In the meantime, the counter-electromotive time period (A) is longer than the counter-electromotive time period (B). In the below, the suffixes (A) and (B) are omitted if it is not necessary to discriminate the counter-electromotive time periods.

Figure 6:
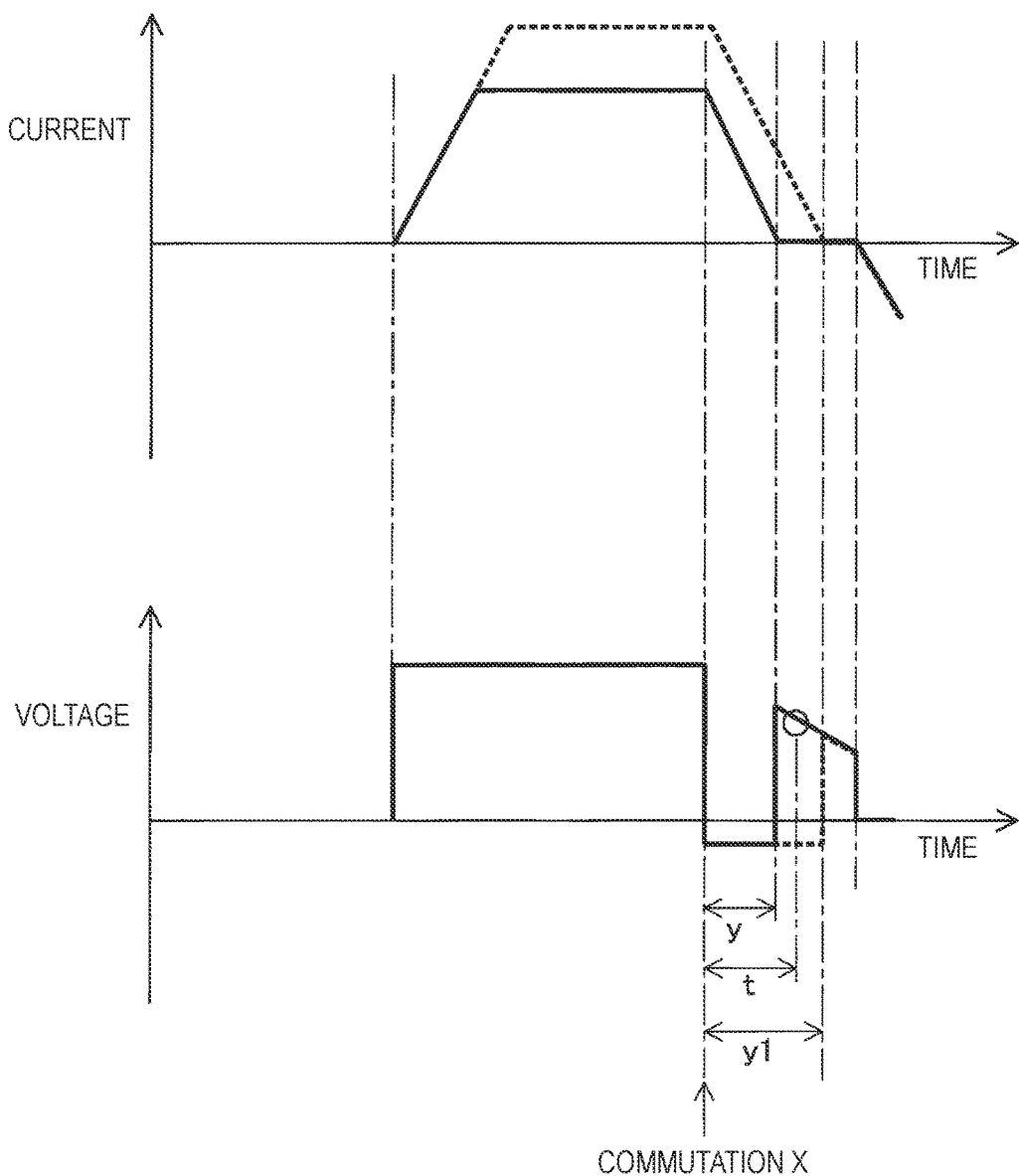
FIG. 6 pictorially depicts an example of a relation between a cross time and a counter-electromotive time period.

FIG. 6 depicts an example of a relation between a cross time t and a counter-electromotive time period y for the counter-electromotive time period (A). The cross time t is an example of the first time period. The cross time t after the energization state is switched from the energization time period to the non-energization time period until the induced voltage reaches the voltage of the neutral point is time that can be estimated from the rotation speed of the brushless motor 62, and is shorter the higher the rotation speed is. In the meantime, the counter-electromotive time period y is time that is longer the more the regenerative current is, and is longer the larger the current value flowing through each coil 621 before switching to the non-energization time period is.

In an example shown with a solid line in FIG. 6, since the counter-electromotive time period y from commutation X, which is a point of time at which the applying time period of the positive voltage is switched to the non-energization time period, is shorter than the cross time t, the control circuit 83 can appropriately acquire the cross point. On the other hand, in an example shown with a broken line in FIG. 6, since the current value is large and a counter-electromotive time period y1 from the commutation X is longer than the cross time t, it is not possible to appropriately acquire the cross point. In the meantime, when the rotation speed of the brushless motor 62 is in a low speed region, since the cross time t is long, a possibility that it is possible to appropriately acquire the cross point even though the counter-electromotive time period y is long is high.

Figure 7:
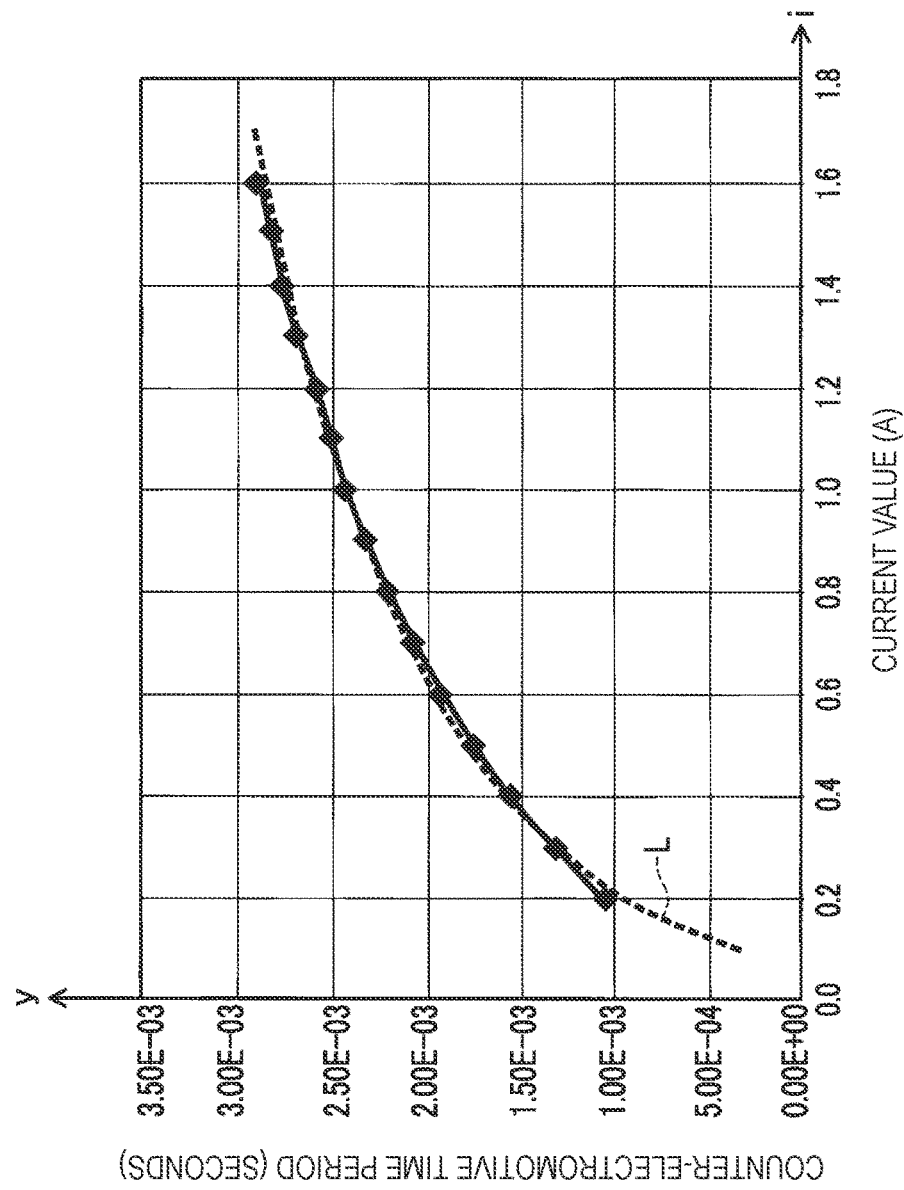
FIG. 7 is a graph depicting an example of a relation between a current value and the counter-electromotive time period.

The counter-electromotive time period is different depending on the current value flowing through the coil 621 of the energization phase before it is switched to the non-energization time period. For example, after currents of diverse magnitudes are caused to flow through the same type of coil as the coil 621, when the energization state is switched to the non-energization time period and a time period until the regenerative current becomes zero is measured, a result as shown in FIG. 7 is obtained. A horizontal axis of FIG. 7 indicates the current value i caused to flow through the coil, and a vertical axis indicates the counter-electromotive time period y corresponding to the current value i.

As shown in FIG. 7, the current value i and the counter-electromotive time period y have a predetermined relation. The counter-electromotive time period y can be calculated based on the current value i, the VM and characteristics of the brushless motor 62. The counter-electromotive time period y is calculated using a natural logarithm ln(i) of the current value i by a following equation P, for example. In the meantime, the characteristics of the brushless motor 62 include an inductance of each coil 621, a resistance value, and a voltage drop of each of the freewheeling diodes 812, 814, for example. 'a' and 'b' in the calculation equation P are fixed values based on the characteristics of the brushless motor 62.

$$y = a \cdot \ln(i) + b \qquad \text{calculation equation P}$$

In an example of FIG. 7, a curve obtained by connecting respective experiment values denoted with black diamonds may be approximated by a broke line L. The broken line L is a curve indicating y=0.0009×ln(i)+0.0024. Under using conditions that the VM and the characteristics of the brushless motor 62 are determined, it is possible to calculate the counter-electromotive time period y corresponding to the current value i by using the calculation equation P. Then, it is possible to determine the current value i at which y<t by comparing the cross time t, which is estimated in a case where the rotation speed of the brushless motor 62 is a predetermined target value, and the counter-electromotive time period y obtained by the calculation equation P. In the meantime, the calculation equation P for obtaining the counter-electromotive time period y is just exemplary, and the present disclosure is not limited thereto.

The printer 100 is configured to determine the current value i at which y<t based on the cross time t at the target rotation speed, and to set the determined current value I as the current upper limit of the inverter circuit 81. Thereby, as described above, in a case where the current value measured with the current measurement unit 82 exceeds the current upper limit, the control circuit 83 lowers the duty ratio of the voltage, which is to be applied to the inverter circuit 81, thereby decreasing the current value. Therefore, a possibility that it is possible to appropriately acquire the cross point is high.

Figure 8:
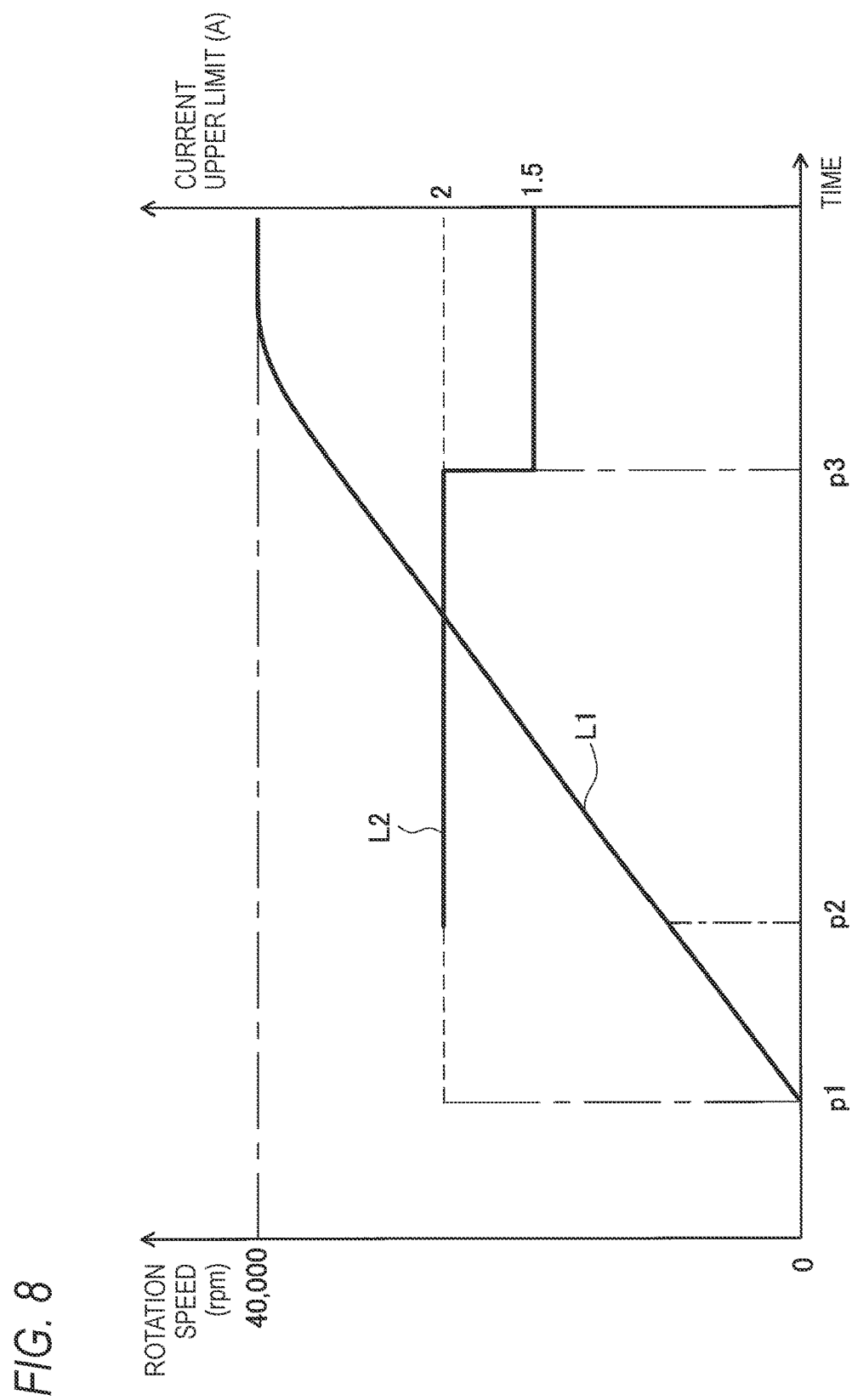
FIG. 8 is a graph depicting an example between a rotation speed and a current upper limit during acceleration.

In a case where a printing instruction is received in a state where a printing operation is not performed, the printer 100 enables the motor driving unit 72 to start rotation of the brushless motor 62 at a stop, to accelerate the brushless motor 62 to a rotation speed of final target and to rotate the brushless motor 62 at constant speed, which is the rotation speed of final target. An example where the rotation speed and the current upper limit change from rotation start of the brushless motor 62 is shown in FIG. 8. In FIG. 8, a change in rotation speed is shown by a line L1 and a left axis, and a change in current upper limit is shown by a line L2 and a right axis.

In the example of FIG. 8, the motor driving unit 72 starts to rotate the brushless motor 62 from a stop state at time p1 and performs forced commutation. Then, the motor driving unit 72 starts phase switching control based on the induced voltage, at time p2. During the forced commutation, since the induced voltage and the neutral point are not compared, the current upper limit is set to a preset setting value for forced commutation. In the forced commutation, the current (for example, 2 A) within a range permitted for the switching elements 811, 813 is caused to flow.

After starting the phase switching control based on the induced voltage, the cross time t (refer to FIG. 6) is long in a time period in which the rotation speed of the brushless motor 62 is slow. In a time period in which the rotation speed is slow, which is an initial stage during the acceleration of the brushless motor 62, the printer 100 sets the current upper limit to a predetermined value (2 A, in the example of FIG. 8). The predetermined value is an example of the second upper limit, and the rotation speed in the time period in which the cross time is long is an example of the first rotation speed.

The predetermined value is an upper limit based on a standard value of the inverter circuit 81, and is a maximum value that can be set in the control circuit 83, for example. The printer 100 stores the predetermined value in the ROM 32 or the NVRAM 34. In the time period in which the rotation speed is slow, the cross time t is long. Therefore, even though the current upper limit is set to the predetermined value, a possibility that the counter-electromotive time period y is shorter than the cross time t and the cross point can be appropriately acquired is high. Also, the current upper limit is set large, so that the rotation speed can be easily increased and the starting-up time is thus short.

When the rotation speed of the brushless motor 62 is increased by the acceleration, the cross time t becomes shorter. For this reason, a possibility that it is not possible to appropriately acquire the cross point increases in a state where the current upper limit is kept at the predetermined value. In the printer 100, in a time period in which the rotation speed of the brushless motor 62 is higher than a predetermined first speed threshold value and is lower than a predetermined second speed threshold value, when accelerating the brushless motor 62 to the second speed threshold value, which is a target speed, the current value i at which the cross time t is longer than the counter-electromotive time period y at the second speed threshold value is determined by the calculation based on the calculation equation P. The determined current value i is an example of the first upper limit.

In the example of FIG. 8, the motor driving unit 72 lowers the current upper limit from 2 A to 1.5 A, at time p3. 1.5 A is the current value i at which the cross time t is longer than the counter-electromotive time period y at 40000 rpm, which is the rotation speed of final target of the brushless motor 62, for example.

In the meantime, for example, as shown in FIG. 9, a correspondence table 321 in which the counter-electromotive time period y corresponding to the current value i is stored may be used instead of the calculation based on the calculation equation P. That is, the counter-electromotive time period y shorter than the estimated cross time t may be selected from the correspondence table 321, and the current value i corresponding to the selected counter-electromotive time period y may be determined. In this case, the printer 100 stores the correspondence table 321 in the ROM 32 or the NVRAM 34.

When the correspondence table 321 is used, it is possible to easily set the current value i. On the other hand, when the current value i is determined using the calculation equation P, it is possible to specifically set the current value i. In the meantime, instead of the correspondence table 321, a correspondence table in which the cross time t and the current value i corresponding to the cross time t are stored or a correspondence table in which a target rotation speed and the current value i corresponding to the target rotation speed are stored may be used.

The printer 100 sets the determined current value i as the current upper limit of the inverter circuit 81, and controls driving of the brushless motor 62 with the motor driving unit 72. In the meantime, the motor driving unit 72 is provided with a mask time period, which is a time period including the counter-electromotive time period y, and does not compare the induced voltage and the voltage of the neutral point during the mask time period. The mask time period is a length including the counter-electromotive time period y, and is required to be set as a time period shorter than the cross time t.

Subsequently, a sequence of rotation control processing of controlling the rotation of the brushless motor 62 is described with reference to a flowchart of FIG. 10. The rotation control processing is executed by the motor driving unit 72 when the polygon mirror 61 starts to rotate as a printing command is received, for example.

In the rotation control processing, the motor driving unit 72 first sets the current upper limit to a setting value (S101). The setting value is a predetermined current upper limit that is set upon start of the forced commutation. The setting value may be the same as or different from the above-described predetermined value. Then, the motor driving unit 72 outputs a predetermined signal from the control circuit 83 to the inverter circuit 81, and performs activation by the forced commutation (S102). In the forced commutation, the motor driving unit 72 performs commutation i.e., switches the ON and OFF states of the respective switching elements 811, 813 of the inverter circuit 81 every predetermined time.

The motor driving unit 72 detects an induced voltage, which is generated by the rotation of the brushless motor 62. Then, the motor driving unit 72 determines whether the induced voltage is detected (S103). Specifically, the motor driving unit 72 determines whether the generated induced voltage exceeds the voltage of the neutral point and the cross point based on the induced voltage can be acquired. In a case where it is determined that the induced voltage is not detected (S103: NO), the motor driving unit 72 further continues the forced commutation.

In a case where it is determined that the induced voltage is detected (S103: YES), the motor driving unit 72 starts commutation control based on the induced voltage (S104). Upon start of the commutation control based on the induced voltage, the motor driving unit 72 sets the current upper limit to the above-described predetermined value. Thereby, the motor driving unit 72 causes the current of which the upper limit is the predetermined value to flow through the coil 621, and switches the ON and OFF states of the respective switching elements 811, 813 of the inverter circuit 81, based on the cross point indicating that the detected induced voltage has reached the voltage of the neutral point. The commutation control that starts in S103 is an example of the first switching processing.

The motor driving unit 72 can acquire a present rotation speed, based on a detection period of the induced voltage. Then, the motor driving unit 72 determines whether the acquired rotation speed is equal to or higher than a first rotation speed (S105). The first rotation speed is a rotation speed in a time period in which the cross time is long. In a case where the rotation speed is slower than the first rotation speed, the motor driving unit 72 can appropriately control the rotation of the rotor 622 even though the current upper limit is the predetermined value. Therefore, in a case where it is determined that the acquired rotation speed is slower than the first rotation speed (S105: NO), the motor driving unit 72 continues the commutation control based on the induced voltage.

On the other hand, in a case where it is determined that the acquired rotation speed is equal to or higher than the first rotation speed (S105: YES), the motor driving unit 72 determines a settable current upper limit from a second rotation speed (S106). The processing of S106 is an example of the determining of the first upper limit. The second rotation speed is a speed higher than the first rotation speed, and for example, is the rotation speed of final target set for the brushless motor 62. Also, the settable current upper limit is a current value at which the cross time is longer than the counter-electromotive time period at the second rotation speed. The motor driving unit 72 determines the current value i based on the correspondence table 321, for example. Alternatively, the motor driving unit 72 may determine the current value i by the calculation based on the calculation equation P. The current upper limit determined in S106 is an example of the first upper limit.

Then, the motor driving unit 72 sets the determined settable current upper limit as the current upper limit (S107). The processing of S107 is an example of changing the first switching processing to the second switching processing. Thereby, the current upper limit is changed to be a smaller value such as 2 A to 1.5 A, for example. The processing of S107 is an example of changing the first switching processing to the second switching processing. Also, the motor driving unit 72 continues the commutation control within a range up to the set current upper limit. The processing of performing the commutation control at the current upper limit changed in S107 is an example of the second switching processing.

Then, the motor driving unit 72 determines whether the rotation speed of the brushless motor 62 has reached the rotation speed of final target (S108). In a case where it is determined that the rotation speed of the brushless motor 62 has not reached the rotation speed of final target (S108: NO), the motor driving unit 72 further continues the commutation control, and increases the rotation speed of the brushless motor 62.

On the other hand, in a case where it is determined that the rotation speed of the brushless motor 62 has reached the rotation speed of final target (S108: YES), the motor driving unit 72 starts a printing operation (S109). In the meantime, the printing operation is executed after the rotation speed of the brushless motor 62 has reached the rotation speed of final target and preparation of the other members has also been completed. Also, after the rotation speed of the brushless motor 62 has reached the rotation speed of final target, it is not necessary to accelerate the brushless motor 62. Therefore, the current setting value in speed control processing (which will be described later) becomes smaller than the current upper limit.

Then, the motor driving unit 72 determines whether the printing operation of the received printing command is over (S110). In a case where it is determined that the printing operation is not over (S110: NO), the motor driving unit 72 continues the printing operation. In a case where it is determined that the printing operation is over (S110: YES), the motor driving unit 72 stops the rotative driving of the motor (S111), and ends the rotation control processing.

Figure 11:
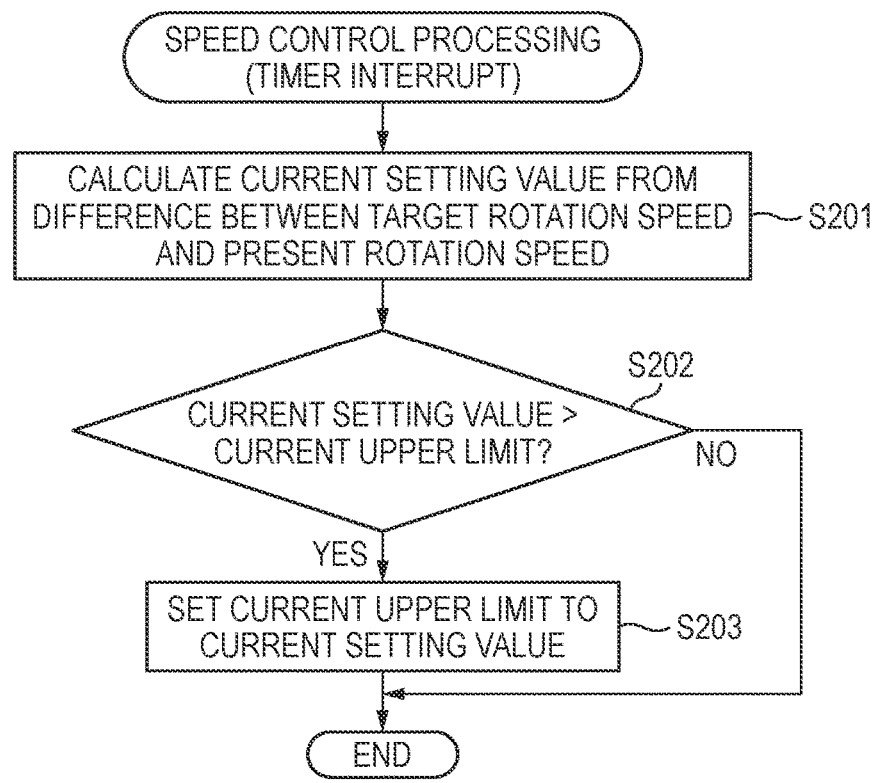
FIG. 11 is a flowchart depicting a sequence of speed control processing.

Subsequently, a sequence of the speed control processing of controlling the rotation speed of the brushless motor 62 is described with reference to a flowchart of FIG. 11. The speed control processing is executed by interrupt processing every predetermined time by the control circuit 83 of the motor driving unit 72 after the commutation control based on the induced voltage starts in S103 of the rotation control processing.

The control circuit 83 calculates a current setting value from a difference between the target rotation speed and the present rotation speed (S201). For example, in a case where the target rotation speed is higher than the present rotation speed, the current setting value to be calculated becomes a large value so as to increase the rotation speed of the brushless motor 62. The target rotation speed is determined in S104 of the rotation control processing.

Then, the control circuit 83 determines whether the calculated current setting value is larger than the set current upper limit (S202). In a case where it is determined that the calculated current setting value is larger than the set current upper limit (S202: YES), the control circuit 83 sets the current upper limit as the current setting value (S203). That is, the control circuit 83 does not cause the current greater than the current upper limit to flow through the inverter circuit 81.

After S203 or in a case where it is determined that the calculated current setting value is not larger than the set current upper limit (S202: NO), the control circuit 83 ends the speed control processing. Thereby, for at least a time period until next interrupt, the current value flowing through each coil is set to a value equal to or smaller than the current upper limit.

Meanwhile, in FIG. 8, the current upper limit is reduced at time p3, and then the reduced current upper limit is kept. Herein, as described above, regarding the counter-electromotive time period (A) caused due to the switching from the applying time period of the positive voltage to the non-energization time period and the counter-electromotive time period (B) caused due to the switching from the applying time period of the negative voltage to the non-energization time period, in a case where it is known that the counter-electromotive time period (A) is longer, the current upper limit may be reduced only for the energization time period before the counter-electromotive time period (A), instead of reducing the current upper limit for the entire time period of the energization period.

Figure 12:
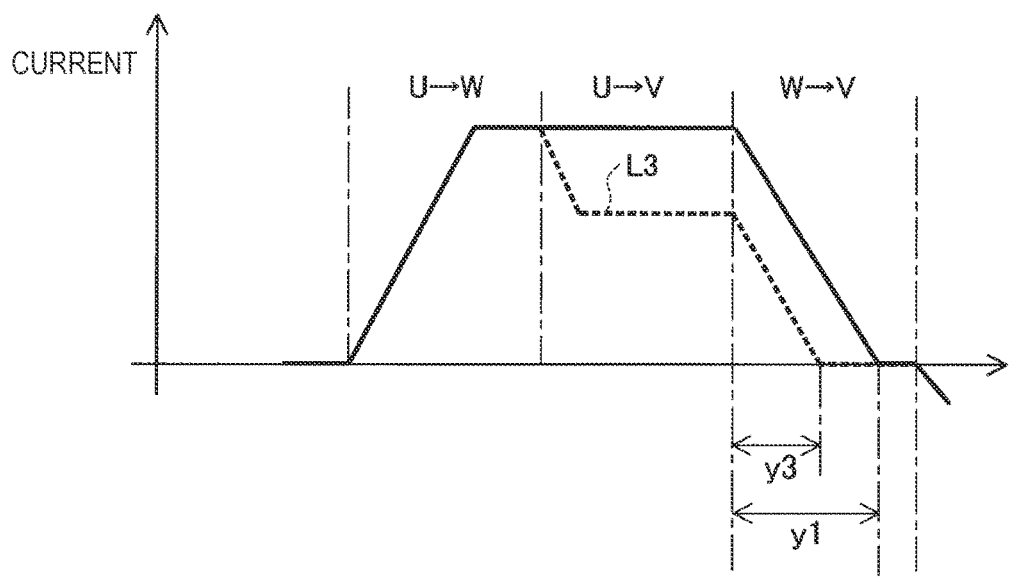
FIG. 12 pictorially depicts an example of a relation between phase switching timing and change timing of the current upper limit.

For example, only for a time period of an electrical angle 60° before the counter-electromotive time period (A) of an electrical angle 120°, which is an energization time period of each phase, the current upper limit may be reduced, and for a time period of the other electrical angles 60°, the current upper limit may not be reduced. In the example of FIG. 5, for each energization time period of U→V, W→U and V→W, the processing of S107 in the rotation control processing may be performed, and for each energization time period of the other U→W, W→V and V→U, the processing of S107 in the rotation control processing may not be performed and the current upper limit may be returned to a value before the reduction. Even in this configuration, for example, as shown with a broken line L3 in FIG. 12, the counter-electromotive time period y can be shortened to y3 shorter than y1. On the other hand, an example shown with a solid line in FIG. 12 is an example where the counter-electromotive time period y1 is longer than the cross time t, like the example shown with the broken line in FIG. 6.

Figure 13:
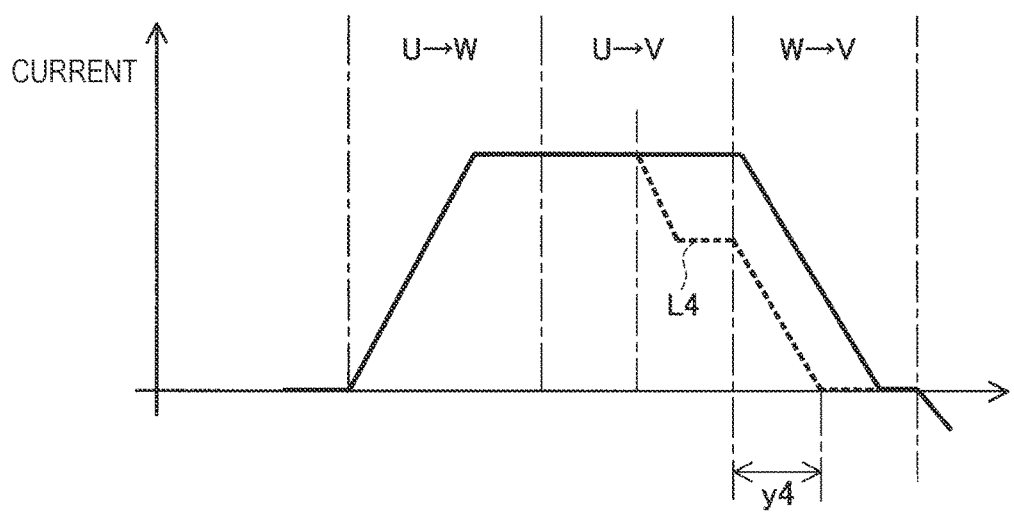
FIG. 13 pictorially depicts an example of the relation between the phase switching timing and the change timing of the current upper limit.

Also, for example, the time period in which the current upper limit is reduced may be made to be further shorter than the time period of the electrical angle 60°. For example, only for a time period of about an electrical angle 30° before the counter-electromotive time period (A) of the electrical angle 120°, which is an energization time period, the current upper limit may be reduced, and for a time period of the other electrical angles 90°, the current upper limit may not be reduced. In the example of FIG. 5, after the energization time period of U→W is switched to the energization time period of U→V, for a time period after the induced voltage of the W-phase reaches the neutral point until the energization time period of U→V is over, the processing of S107 in the rotation control processing may be performed, and for a remaining time period of the energization time period of U→W or U→V, the current upper limit may be returned to a value before the reduction. Likewise, only for a second half of the energization time period of W→U or V→W, the processing of S107 in the rotation control processing may be performed. Even in this configuration, for example, as shown with a broken line L4 in FIG. 13, the counter-electromotive time period y can be set to y4 shorter than y1.

In this way, even when the time period in which the current upper limit is to be reduced is limited, since at least the counter-electromotive time period (A) is shortened, the possibility that it is possible to appropriately detect the cross point increases. For the other time period, since the current upper limit is not reduced, it is possible to increase the rotation speed more rapidly and to shorten the time necessary for the starting-up of the brushless motor 62.

Meanwhile, in the rotation control processing (FIG. 10), in a case where the rotation speed of the brushless motor 62 becomes equal to or higher than the first rotation speed, the current upper limit is changed. However, not only after the rotation speed of the brushless motor 62 reaches the first rotation speed but also after the rotation speed of the brushless motor 62 reaches the second rotation speed, when the brushless motor 62 is accelerated to a third rotation speed higher than the second rotation speed, the current upper limit may be further changed, for example. That is, the first rotation speed may be updated based on the rotation speed at that point of time, the second rotation speed higher than the first rotation speed after the update may be estimated, and the current upper limit may be further changed, as necessary.

A sequence of rotation control processing of changing the current upper limit while updating the first rotation speed and thus controlling the rotation of the brushless motor 62 is described with reference to a flowchart of FIG. 14. This rotation control processing is executed by the motor driving unit 72 when the polygon mirror 61 starts to rotate as a printing command is received, for example.

Figure 10:
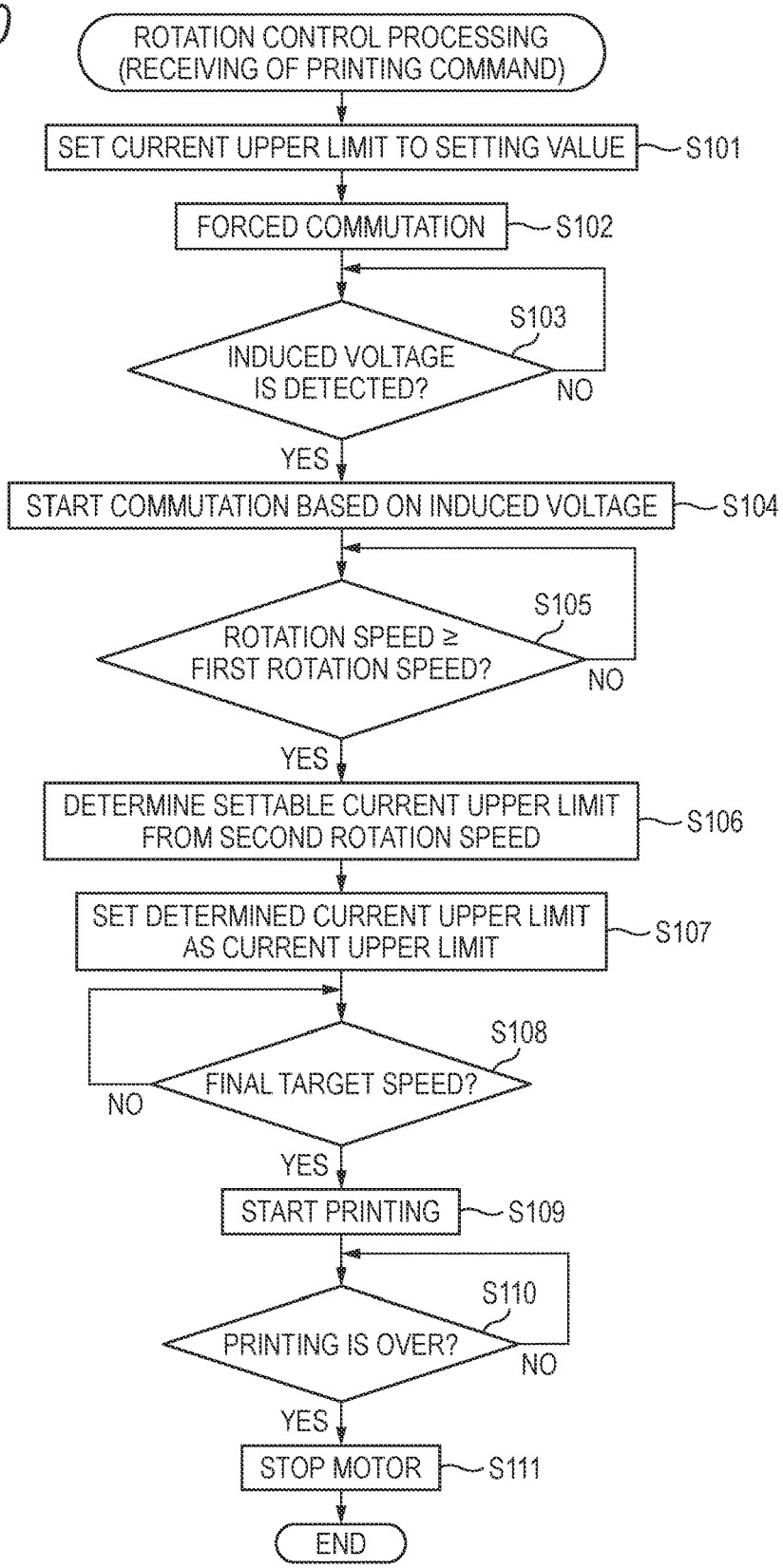
FIG. 10 is a flowchart depicting a sequence of rotation control processing.

The processing of S301 to S304 of the rotation control processing shown in FIG. 14 is similar to the processing of S101 to S104 of the rotation control processing shown in FIG. 10. That is, the motor driving unit 72 first sets the current upper limit to the setting value (S301). Then, the motor driving unit 72 outputs a predetermined signal from the control circuit 83 to the inverter circuit 81, and performs activation by forced commutation (S302). Also, the motor driving unit 72 determines whether the induced voltage is detected (S303). In a case where it is determined that the induced voltage is not detected (S303: NO), the motor driving unit 72 further continues the forced commutation. In a case where it is determined that the induced voltage is detected (S303: YES), the motor driving unit 72 starts commutation control based on the induced voltage (S304). The commutation control that starts in S304 is an example of the first switching processing.

Then, the motor driving unit 72 calculates a detection period of the induced voltage at that point of time from a difference between detection time of the induced voltage at that point of time and detection time of one previous induced voltage, and estimates the cross time at a rotation speed, which is a next target, based on the calculated detection period of the induced voltage (S305). In the meantime, since the detection period of the induced voltage is sufficiently fast with respect to the motor acceleration, a half of the detection period of the induced voltage at that point of time can be estimated as the cross time. In a case of estimating the cross time more correctly, the motor acceleration is estimated from mass of the motor and the current setting value set in the speed control processing, and a next detection period of the induced voltage with respect to the detection period of the induced voltage at that point of time is reduced by the estimated acceleration. That is, a half of the reduced detection period of the induced voltage may be estimated as the cross time.

Also, the motor driving unit 72 determines a settable current upper limit at the next target rotation speed, based on the estimated cross time (S306). The current upper limit at the second rotation speed is an example of the first upper limit, and the processing of S306 determining the first upper limit is an example of the determining of the first upper limit. The current upper limit at the third rotation speed higher than the second rotation speed is an example of the third upper limit, and the processing of S306 determining the third upper limit is an example of the determining of the third upper limit. In the meantime, since the third rotation speed is higher than the second rotation speed, the third upper limit is a value less than the second upper limit. Also, the cross time t at the third rotation speed is an example of the third time period, and the counter-electromotive time period y by the third upper limit is an example of the fourth time period.

Then, the motor driving unit 72 determines whether the present current upper limit is greater than the settable current upper limit determined in S306 (S307). In a case where it is determined that the present current upper limit is greater than the settable current upper limit (S307: YES), the motor driving unit 72 changes the current upper limit to the settable current upper limit determined in S306 (S308). The processing of S308 is an example of the changing of the first switching processing to the second switching and the changing of the third switching processing to the fourth switching processing.

Also, the motor driving unit 72 continues the commutation control within a range up to the set current upper limit. The processing of performing the commutation control at the current upper limit changed in the first change processing is an example of the second switching processing. Also, the processing of performing the commutation control at the current upper limit before the third switching processing is changed to the fourth switching processing is an example of the third switching processing. The processing of performing the commutation control at the current upper limit which is changed by changing the third switching processing to the fourth switching processing is an example of the fourth switching processing.

After S308 or in a case where it is determined that the present current upper limit is not greater than the settable current upper limit (S307: NO), the motor driving unit 72 determines whether the rotation speed of the brushless motor 62 has reached the rotation speed of final target (S309). In a case where it is determined that the rotation speed of the brushless motor 62 has not reached the rotation speed of final target (S309: NO), the motor driving unit 72 returns to S305, detects the induced voltage to estimate the cross time, and continues to accelerate the motor.

On the other hand, in a case where it is determined that the rotation speed of the brushless motor 62 has reached the rotation speed of final target (S309: YES), the motor driving unit 72 starts a printing operation (S310). Then, the motor driving unit 72 determines whether the printing operation of the received printing command is over (S311). In a case where it is determined that the printing operation is not over (S311: NO), the motor driving unit 72 continues the printing operation. In a case where it is determined that the printing operation is over (S311: YES), the motor driving unit 72 stops the rotative driving of the motor (S312), and ends the rotation control processing. The processing of S310 to S312 of the rotation control processing shown in FIG. 14 is similar to the processing of S109 to S111 of the rotation control processing shown in FIG. 10.

As described above in detail, the printer 100 of the illustrative embodiment includes the motor driving unit 72 configured to control the rotative driving of the brushless motor 62. The motor driving unit 72 is configured to determine the current value i at which the cross time t, which is from the start of the non-energization time period starts until the induced voltage reaches the threshold value, is longer than the counter-electromotive time period y, which is from the start of the non-energization time period of each coil until the counter-electromotive voltage becomes zero during the acceleration time period of the brushless motor 62. Also, the motor driving unit 72 is configured to change the current upper limit from a value larger than the determined current value i to the determined current value i in the driving switching control of switching the ON and OFF states of the inverter circuit 81. For example, when the driving switching of each coil is caused to start with the current upper limit being set to a predetermined value (a value at which the brushless motor 62 is started-up at the highest speed or an approximate value thereof) and then the current upper limit is set to the current value i smaller than the predetermined value, it is possible to easily detect the cross point even though the rotation speed of the brushless motor 62 is increased. Also in this case, upon the starting-up of the brushless motor 62, the current upper limit is large and the delay in starting-up time is small.

In the meantime, the illustrative embodiments are just exemplary and do not limit the present disclosure. Therefore, the present disclosure can be improved and modified in diverse forms without departing from the spirit thereof. For example, the present disclosure can be applied to any apparatus having a brushless motor device such as a copier, a FAX apparatus and the like, without being limited to the printer.

Also, for example, in the illustrative embodiment, the current upper limit is changed to be smaller, so that the current value is made smaller. However, the present disclosure is not limited to the change of the current upper limit inasmuch as the current value can be made smaller. Specifically, for a time period in which the current value is limited, the current value can be made smaller by reducing the duty ratio of the PWM.

Also, for example, the timing at which the current upper limit is determined, i.e., the timing at which the processing of S104 in the rotation control processing is executed may be periodic, may be timing at which predetermined time has elapsed after the commutation control based on the induced voltage starts, or may be timing at which the rotation speed of the brushless motor 62 has reached a predetermined value.

Also, for example, the change of the current upper limit may be executed at least once during the acceleration time period after the brushless motor 62 starts to rotate until the rotation speed thereof reaches the rotation speed of final target. That is, after the rotation control of the brushless motor 62 starts with the current upper limit being set to the predetermined value, in a case where it is determined that the counter-electromotive time period y is not shorter than the cross time t, the current value i at which the cross time t is longer than the counter-electromotive time period y at the rotation speed of final target may be set as the current upper limit. However, a configuration where a plurality of target speeds is provided and the current upper limit is changed in a stepwise fashion is preferable because the delay in the starting-up time becomes less.

In the meantime, the present disclosure further discloses a brushless motor device including a rotor having a magnetic pole; a stator including a coil including a first coil, a second coil, and a third coil, first ends of the first coil, the second coil, and the third coil being Y-connected to each other; an inverter circuit including: switching elements respectively arranged between second ends of the first coil, the second coil, and the third coil and a power supply voltage; and switching elements respectively arranged between the second ends of the first coil, the second coil, and the third coil and a ground voltage; and a control device configured to: during an energization time period of the first coil in which the current is caused to flow from the first coil to the second coil after the current is caused to flow from the first coil to the third coil, perform first switching processing of switching ON and OFF states of each switching element of the inverter circuit within a range in which current flowing through the coil becomes equal to or smaller than a second upper limit greater than a first upper limit during a time period in which the current is caused to flow from the first coil to the third coil, and perform second switching processing of switching the ON and OFF states of each switching element of the inverter circuit within a range in which the current flowing through the coil becomes equal to or smaller than the first upper limit during a time period in which the current is caused to flow from the first coil to the second coil.

Also, the processing disclosed in the illustrative embodiments may be executed by the hardware such as a single CPU, a plurality of CPUs, an ASIC and the like or a combination thereof. Also, the processing disclosed in the illustrative embodiments can be implemented in a variety of aspects such as a storage medium having a program for executing the processing stored therein, a method, and the like.

What is claimed is:

1. A brushless motor device comprising:
a brushless motor including:
- a rotor having a magnetic pole; and
- a stator including a coil including a first coil, a second coil, and a third coil, first ends of the first coil, the second coil, and the third coil being Y-connected to each other; and a motor driver configured to drive the brushless motor, the motor driver including an inverter circuit including:
- first switching elements respectively arranged between second ends of the first coil, the second coil, and the third coil and a power supply voltage; and
- second switching elements respectively arranged between the second ends of the first coil, the second coil, and the third coil and a ground voltage;

wherein the motor driver is configured to:
- determine a first upper limit of a current value which flows through the coil when a rotation speed of the rotor is accelerated from a first rotation speed to a second rotation speed higher than the first rotation speed, wherein, in a case where the current value of the first upper limit flows through the coil when the rotor is rotated at the second rotation speed, a first time period, which is from a start of a non-energization time period of the coil until an induced voltage reaches a threshold value, is longer than a second time period, which is from the start of the non-energization time period of the coil until a counter-electromotive voltage becomes zero;
- perform first switching processing of switching ON and OFF states of each switching element of the inverter circuit within a range in which current flowing through the coil becomes equal to or smaller than a second upper limit greater than the first upper limit;
- perform second switching processing of switching the ON and OFF states of each switching element of the inverter circuit within a range in which the current flowing through the coil becomes equal to or smaller than the first upper limit; and
- change the first switching processing to the second switching processing during a time period in which the rotation speed of the rotor is accelerated from the first rotation speed to the second rotation speed.

2. The brushless motor device according to claim 1,
wherein, during an energization time period of the first coil in which the current is caused to flow from the first coil to the second coil after the current is caused to flow from the first coil to the third coil, the motor driver is configured to change the first switching process to the second switching process such that:
- the first switching processing is performed during a time period in which the current is caused to flow from the first coil to the third coil; and
- the second switching processing is performed during a time period in which the current is caused to flow from the first coil to the second coil.

3. The brushless motor device according to claim 1,
wherein, during an energization time period of the first coil in which the current is caused to flow from the first coil to the second coil after the current is caused to flow from the first coil to the third coil, the motor driver is configured to change the first switching process to the second switching process such that:
- the first switching processing is performed for a time period before an induced voltage generated in the third coil reaches the threshold value; and
- the second switching processing is performed for a time period after the induced voltage generated in the third coil reaches the threshold value.

4. The brushless motor device according to claim 1,
wherein the motor driver is configured to determine the first upper limit based on a calculation equation including at least an inductance of the coil and the power supply voltage.

5. The brushless motor device according to claim 1,
wherein the second time period that is used for determining the first upper limit is a time period until a counter-electromotive voltage, which was generated upon switching from an energization time period during which the power supply voltage had been applied to the coil to the non-energization time period, becomes zero.

6. The brushless motor device according to claim 1,
wherein the motor driver is further configured to:
- provide a mask time period which becomes longer as the first upper limit becomes greater; and
- not determine whether the induced voltage has reached the threshold value during the mask time period.

7. The brushless motor device according to claim 1,
wherein the motor driver is further configured to:
- determine a third upper limit of the current value which flows through the coil when the rotation speed of the rotor is accelerated from the second rotation speed to the third rotation speed higher than the second rotation speed, wherein, in a case where the current value of the third upper limit flows through the coil when the rotor is rotated at the third rotation speed, a third time period, which is from a start of a non-energization time period of the coil until the induced voltage reaches a threshold value, is longer than a fourth time period, which is from the start of the non-energization time period until the counter-electromotive voltage becomes zero;
- perform third switching processing of switching the ON and OFF states of each switching element of the inverter circuit within a range in which the current flowing through the coil becomes equal to or smaller than a fourth upper limit greater than the third upper limit and smaller than the second upper limit;
- perform fourth switching processing of switching the ON and OFF states of each switching element of the inverter circuit within a range in which the current flowing through the coil becomes equal to or smaller than the third upper limit; and
- change the third switching processing to the fourth switching processing during a time period in which the rotation speed of the rotor is accelerated from the second rotation speed to the third rotation speed.

8. The brushless motor device according to claim 1,
wherein the motor driver is further configured to:
- update the first rotation speed in association with an increase in the rotation speed of the rotor; and
- estimate the second rotation speed based on the updated first rotation speed, each time the first rotation speed has been updated; and wherein the motor driver is configured to determine the first upper limit by using the estimated second rotation speed and perform the second switching processing by using the determined first upper limit, each time the first rotation speed has been updated.

9. An image forming apparatus comprising:
a light source configured to emit a light beam;
a mirror configured to deflect the light beam; and
a brushless motor device according to claim 1, wherein the brushless motor is configured to rotate the mirror.

10. The image forming apparatus according to claim 9, further comprising a memory configured to store a length of the second time that corresponds to a current value flowing through the coil,
wherein the motor driver is configured to determine the first upper limit by selecting the second time period shorter than the first time period and determining a current value corresponding to the selected second time period as the first upper limit by referring to the memory.

11. A control method for controlling a brushless motor, the brushless motor including: a rotor having a magnetic pole; a stator including a coil including a first coil, a second coil, and a third coil, first ends of the first coil, the second coil, and the third coil being Y-connected to each other; and an inverter circuit including: first switching elements respectively arranged between second ends of the first coil, the second coil, and the third coil and a power supply voltage; and second switching elements respectively arranged between the second ends of the first coil, the second coil, and the third coil and a ground voltage; the method comprising:
determining a first upper limit of a current value which flows through the coil when a rotation speed of the rotor is accelerated from a first rotation speed to a second rotation speed higher than the first rotation speed, wherein, in a case where the current value of the first upper limit flows through the coil when the rotor is rotated at the second rotation speed, a first time period, which is from a start of a non-energization time period of the coil until an induced voltage reaches a threshold value, is longer than a second time period, which is from the start of the non-energization time period of the coil until a counter-electromotive voltage becomes zero;
performing first switching processing of switching ON and OFF states of each switching element of the inverter circuit within a range in which current flowing through the coil becomes equal to or smaller than a second upper limit greater than the first upper limit;
performing second switching processing of switching the ON and OFF states of each switching element of the inverter circuit within a range in which the current flowing through the coil becomes equal to or smaller than the first upper limit; and
changing the first switching processing to the second switching processing during a time period in which the rotation speed of the rotor is accelerated from the first rotation speed to the second rotation speed.

* * * * *